(12) United States Patent
Kondo (10) Patent No.: US 8,123,601 B2
(45) Date of Patent: Feb. 28, 2012

(54) GAME DEVICE, GAME DEVICE CONTROL METHOD, AND INFORMATION STORAGE MEDIUM FOR REALIZING A REFERENCE TRAJECTORY

(75) Inventor: Masataka Kondo, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 443 days.

(21) Appl. No.: 12/427,359

(22) Filed: Apr. 21, 2009

(65) Prior Publication Data

US 2009/0270169 A1    Oct. 29, 2009

(30) Foreign Application Priority Data

Apr. 28, 2008    (JP) .................................. 2008-117885

(51) Int. Cl.
*A63F 13/00*    (2006.01)
(52) U.S. Cl. ............................................................. 463/4
(58) Field of Classification Search ................... 463/3, 4
See application file for complete search history.

(56) References Cited

U.S. PATENT DOCUMENTS

| 7,331,856 B1 | 2/2008 | Nakamura et al. | |
| 2005/0164794 A1 | 7/2005 | Tahara | |
| 2006/0287023 A1* | 12/2006 | Yokoyama | 463/3 |

FOREIGN PATENT DOCUMENTS

| JP | 2000116951 A | 4/2000 |
| JP | 2001321564 A | 11/2001 |
| JP | 3262677 B2 | 12/2001 |
| JP | 2005-211242 A | 8/2005 |

OTHER PUBLICATIONS

Japanese Office Action corresponding to Japanese Patent Application No. 2008-117885, dated Mar. 25, 2010.

* cited by examiner

*Primary Examiner* — Thomas L Dickey
(74) *Attorney, Agent, or Firm* — Sughrue Mion, PLLC (57) ABSTRACT

To provide a game device capable of realizing a user interface that makes it easier for a player to realize a reference trajectory to input and a time to begin inputting of the reference trajectory. A display unit (74) displays a game screen including a moving image and a trajectory image for indicating a reference trajectory. The moving image moves from a given initial position to the start point of the reference trajectory. In the case where the moving image reaches the start point of the reference trajectory, the moving image moves along the reference trajectory. A determination unit (78) determines whether or not the position designated by a player is located within an area based on the position of the moving image during a period when the moving image is moving along the reference trajectory. A game process is carried out based on a result of determination.

8 Claims, 9 Drawing Sheets

| FRAME NUMBER | ARROW IMAGE (KIND) | (DISPLAY POSITION) | MOVING IMAGE (KIND) | (DISPLAY POSITION) | DETERMINATION PERIOD |
|---|---|---|---|---|---|
| 1 | - | - | - | - | 0 |
| 2 | - | - | - | - | 0 |
| ... | ... | ... | ... | ... | ... |
| n−i−1 | - | - | - | - | 0 |
| n−i | A | (XA, YA) | C1 | $(Xa_{n-i}, Ya_{n-i})$ | 0 |
| n−i+1 | A | (XA, YA) | C1 | $(Xa_{n-i+1}, Ya_{n-i+1})$ | 0 |
| n−i+2 | A | (XA, YA) | C1 | $(Xa_{n-i+2}, Ya_{n-i+2})$ | 0 |
| ... | ... | ... | ... | ... | ... |
| n−1 | A | (XA, YA) | C1 | $(Xa_{n-1}, Ya_{n-1})$ | 0 |
| n | A | (XA, YA) | S1 | $(Xa_n, Ya_n)$ | 1 |
| n+1 | A | (XA, YA) | S1 | $(Xa_{n+1}, Ya_{n+1})$ | 1 |
| ... | ... | ... | ... | ... | ... |
| n+j | A | (XA, YA) | S1 | $(Xa_{n+j}, Ya_{n+j})$ | 1 |
| n+j+1 | - | - | - | - | 0 |
| ... | ... | ... | ... | ... | ... |
| m−k−1 | - | - | - | - | 0 |
| m−k | B | (XB, YB) | C2 | $(Xb_{m-k}, Yb_{m-k})$ | 0 |
| m−k+1 | B | (XB, YB) | C2 | $(Xb_{m-k+1}, Yb_{m-k+1})$ | 0 |
| ... | ... | ... | ... | ... | ... |
| m−1 | B | (XB, YB) | C2 | $(Xb_{m-1}, Yb_{m-1})$ | 0 |
| m | B | (XB, YB) | S2 | $(Xb_m, Yb_m)$ | 1 |
| ... | ... | ... | ... | ... | ... |
| m+p | B | (XB, YB) | S2 | $(Xb_{m+p}, Yb_{m+p})$ | 1 |
| m+p+1 | - | - | - | - | 0 |
| ... | ... | ... | ... | ... | ... |
| N | - | - | - | - | 0 |

GAME DEVICE, GAME DEVICE CONTROL METHOD, AND INFORMATION STORAGE MEDIUM FOR REALIZING A REFERENCE TRAJECTORY

CROSS-REFERENCE TO RELATED APPLICATION

The present application claims priority from Japanese application JP 2008-117885 filed on Apr. 28, 2008, the content of which is hereby incorporated by reference into this application.

BACKGROUND OF THE INVENTION

1. Field of the Invention

The present invention relates to a game device, a game device control method, and an information storage medium.

2. Description of the Related Art

There is known a game device having an operation input means for use by a player to input a trajectory (trace). For example, there are known a game device having a touch panel (disclosed in, e.g., JP2005-211242A), a game device having a mouse, a game device having a pointing device (disclosed in JP3262677B) and so forth. In such a game device, a player is requested to input, e.g., a reference trajectory, so that the game is controlled based on whether or not the player inputs the reference trajectory.

SUMMARY OF THE INVENTION

In the above described game, a player's not knowing for sure a reference trajectory to input or a time to begin inputting of the reference trajectory may deteriorate the excitement of the game. To address the above, for the above described game, a user interface that makes it easier for a player to realize a reference trajectory to input and a time to begin inputting of the reference trajectory is required to be developed.

The present invention has been conceived in view of the above, and aims to provide a game device, a game device control method, and an information storage medium for realizing a user interface that makes it easier for a player to realize, e.g., a reference trajectory to input and a time to begin inputting of the reference trajectory.

In order to achieve the above described object, according to one aspect of the present invention, there is provided a game device, comprising a display unit for displaying a game screen including a moving image moving within the game screen and a trajectory image for indicating a reference trajectory; a designated position obtaining unit for obtaining a position within the game screen, the position being designated by a player; a first moving image control unit for moving the moving image from a given initial position toward a start point of the reference trajectory; a second moving image control unit, in the case where the moving image reaches the start point of the reference trajectory, for moving the moving image along the reference trajectory; a determination unit for determining whether or not the position obtained by the designated position obtaining unit is located within an area based on a position of the moving image during a period when the moving image is moving along the reference trajectory; and a game processing unit for carrying out a game process based on a result of determination made by the determination unit.

According to another aspect of the present invention, there is provided a control method for controlling a game device, comprising a step of displaying a game screen including a moving image moving within the game screen and a trajectory image for indicating a reference trajectory; a designated position obtaining step of obtaining a position within the game screen, the position being designated by a player; a first moving image control step of moving the moving image from a given initial position toward a start point of the reference trajectory; a second moving image control step, in the case where the moving image reaches the start point of the reference trajectory, of moving the moving image along the reference trajectory; a determination step of determining whether or not the position obtained at the designated position obtaining step is located within an area based on a position of the moving image during a period when the moving image is moving along the reference trajectory; and a game processing step of carrying out a game process based on a result of determination made at the determination step.

According to still another aspect of the present invention, there is provided a program for causing a computer, such as a portable game device, an installation-type game device (a consumer game device), a commercial game device, a personal computer, a portable phone, a personal digital assistant (PDA), and the like, to function as a game device, the program causing the computer to function as a display unit for displaying a game screen including a moving image moving within the game screen and a trajectory image for indicating a reference trajectory; a designated position obtaining unit for obtaining a position within the game screen, the position being designated by a player; a first moving image control unit for moving the moving image from a given initial position toward a start point of the reference trajectory; a second moving image control unit, in the case where the moving image reaches the start point of the reference trajectory, for moving the moving image along the reference trajectory; a determination unit for determining whether or not the position obtained by the designated position obtaining unit is located within an area based on a position of the moving image during a period when the moving image is moving along the reference trajectory; and a game processing unit for carrying out a game process based on a result of determination made by the determination unit.

An information storage medium according to the present invention is a computer readable information storage medium storing the above described program. A program distribution device according to the present invention comprises an information storage medium storing the above described program, for reading the above described program from the information storage medium and distributing the read program. A program distribution method according to the present invention comprises a step of reading the above described program from an information storage medium storing the above described program and a step of distributing the program read.

According to the present invention, a game screen including a moving image moving within the game screen and a trajectory image for indicating a reference trajectory is displayed. The moving image moves from a given initial position to a start point of the reference trajectory. Having reached the start point the reference trajectory, the moving image starts moving along the reference trajectory. According to the present invention, a position designated by a player within the game screen is obtained. Then, it is determined whether or not the position designated by the player is within an area based on the position of the moving image during a period when the moving image is moving along the reference trajectory. Then, a game process is carried out based on the result of the determination. According to the present invention, a user interface which makes it easier for a player to realize a reference trajectory to input, and a time to begin inputting of the reference trajectory, can be realized.

In one embodiment of the present invention, a display manner for the moving image or the trajectory image when the moving image moves from the initial position to the start point of the reference trajectory may be set at a display manner corresponding to the moving speed of the moving image when the moving image moves along the reference trajectory.

In one embodiment of the present invention, the display manner for the moving image or the trajectory image when the moving image moves from the initial position to the start point of the reference trajectory may be set at a display manner corresponding to a relationship between the moving speed of the moving image moving from the initial position to the start point of the reference trajectory and the moving speed of the moving image when the moving image moves along the reference trajectory.

In one embodiment of the present invention, the initial position of the moving image may be set at a position based on the display position of the trajectory image.

In one embodiment of the present invention, the initial position of the moving image may be set at a position based on the start point of the reference trajectory and a movement direction in which the moving image moves after having reached the start point of the reference trajectory.

In one embodiment of the present invention, the moving speed of the moving image moving from the initial position to the start point of the reference trajectory may be set at a moving speed corresponding to the distance between the initial position of the moving image and the start point of the reference trajectory.

DETAILED DESCRIPTION OF THE INVENTION

In the following, one example of an embodiment of the present invention will be described in detail with reference to the accompanying drawings. Here, a case in which a portable game device is used to realize a game device according to an embodiment of the present invention will be described. Note that a game device according to an embodiment of the present invention can also be realized using an installation-type game device (a consumer game device), a commercial game device, a portable phone, a personal digital assistant (PDA), or a personal computer.

Figure 1:
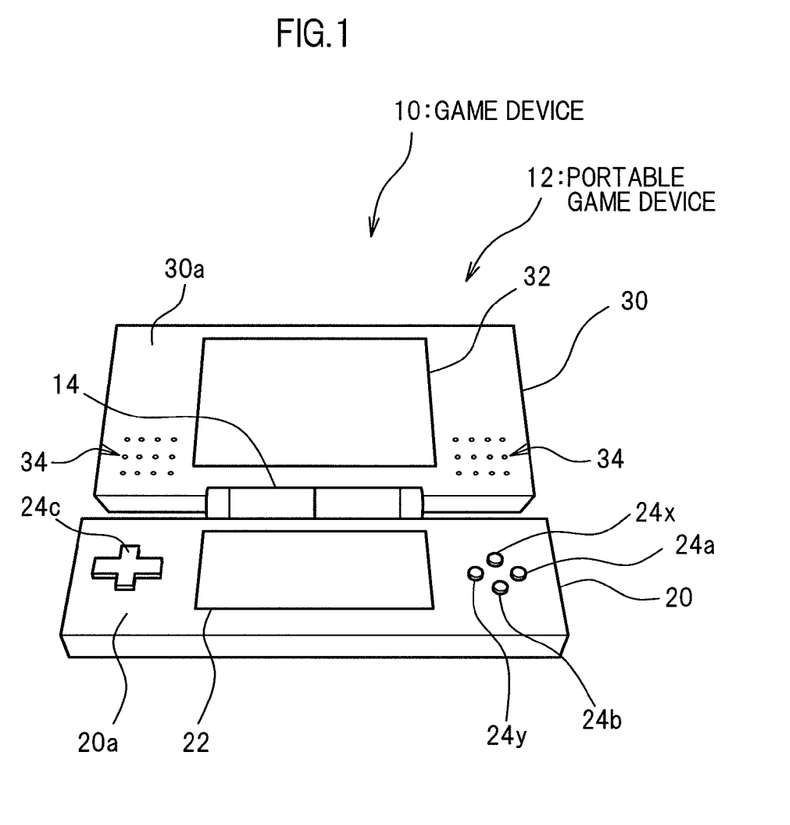
FIG. 1 is a diagram showing eternal appearance of a game device according to an embodiment of the present invention.
Figure 2:
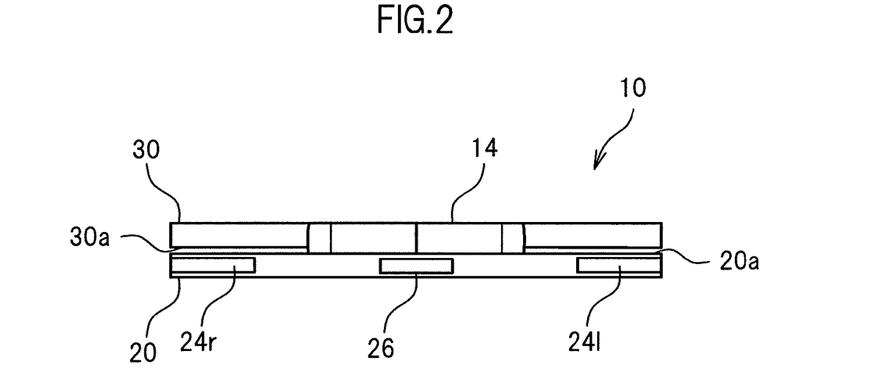
FIG. 2 is a diagram showing eternal appearance of a game device according to an embodiment of the present invention.
Figure 3:
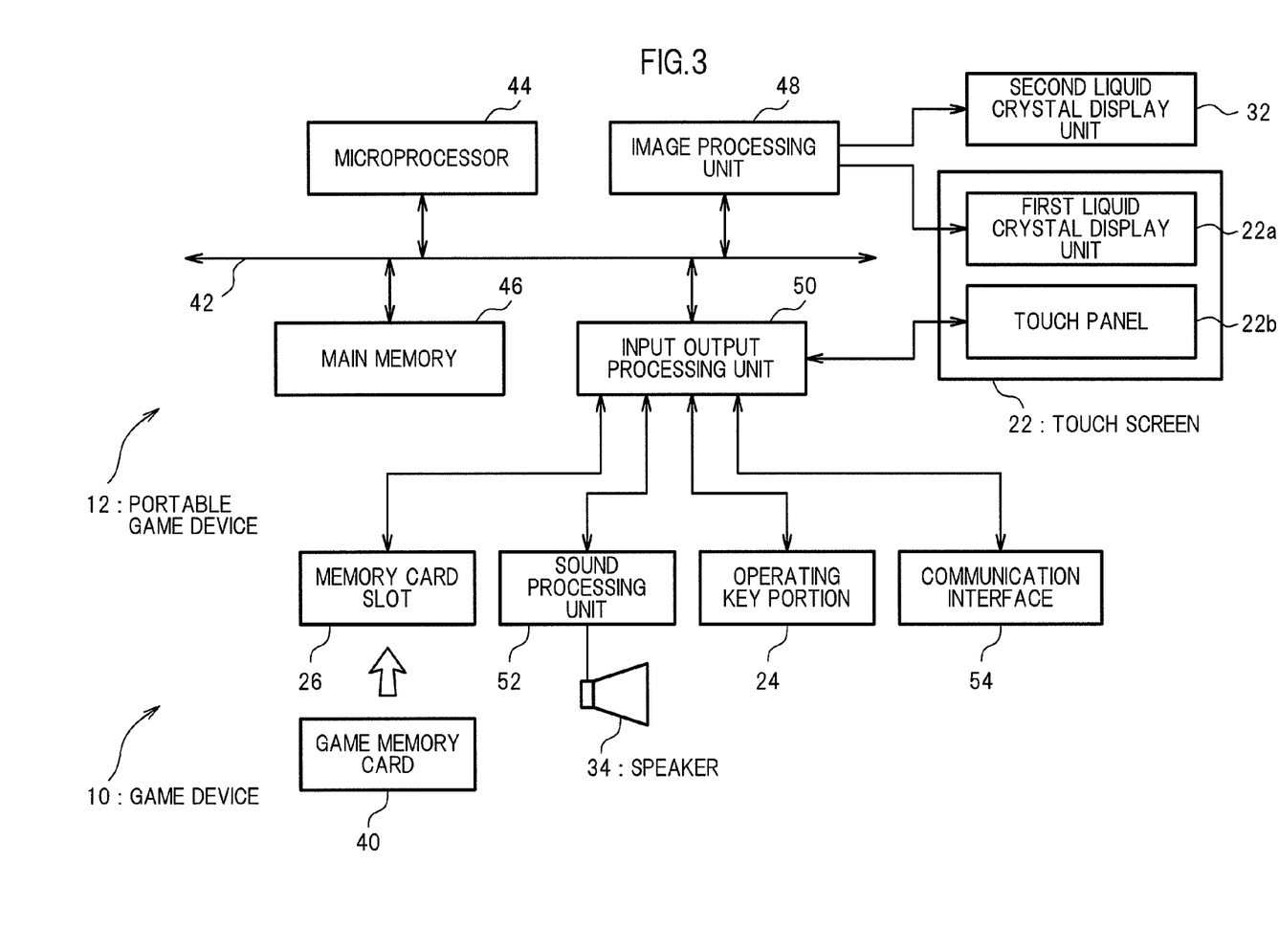
FIG. 3 is a diagram showing a hardware structure of a game device according to an embodiment of the present invention.

FIGS. 1 and 2 show external appearance of a game device 10 according to this embodiment. FIG. 3 shows a hardware structure of the game device 10 according to this embodiment.

FIG. 1 is a perspective view of the game device 10 viewed from the front side thereof. As shown in FIG. 1, the game device 10 comprises a first enclosure 20 and a second enclosure 30, both being connected to each other via a hinge 14. On the surface 20a of the first enclosure 20, there are provided a touch screen 22, a cross button 24c, and buttons 24a, 24b, 24x, 24y. The touch screen 22 includes a first liquid crystal display unit 22a and a touch panel 22b placed over the first liquid crystal display unit 22a (see FIG. 3). The cross button 24c is used, e.g., to instruct a direction. The buttons 24a, 24b, 24x, 24y are used to perform various operations. On the surface 30a of the second enclosure 30, there is provided a second liquid crystal display unit 32. The second enclosure 30 has a built-in speaker 34.

FIG. 2 is a rear elevation view of the game device 10 in a folded position (the surface 20a of the first enclosure 20 is placed on the surface 30a of the second enclosure 30). As shown in FIG. 2, the buttons 24l, 24r are provided on the left and right ends, respectively, of the rear-side lateral surface of the first enclosure 20. Further, a memory card slot 26 for accepting a game memory card 40, or an information storage medium (see FIG. 3), is formed at the middle portion on the rear-side lateral surface of the first enclosure 20. Note that another member, such as a power supply switch (not shown) or the like, is connected to the game device 10.

As shown in FIG. 3, the game device 10 comprises a touch screen 22 (the first liquid crystal display unit 22a and touch panel 22b), an operating key portion 24, a memory card slot 26, a second liquid crystal display unit 32, a speaker 34, a bus 42, a microprocessor 44, a main memory 46, an image processing unit 48, an input output processing unit 50, a sound processing unit 52, and a communication interface 54, all of which, as well as a battery (not shown), are accommodated in an enclosure and driven by the battery.

The microprocessor 44 controls the respective units of the game device 10, based on an operating system stored in a ROM (not shown) and a program and data stored in the game memory card 40. The main memory 46 comprises, e.g., a RAM. A program read from the memory card 40 is written into the main memory 46 upon necessity. The main memory 46 is used also as a working memory of the microprocessor 44. The bus 42 is used to exchange address and data among the respective units of the game device 10. The microprocessor 44, main memory 46, image processing unit 48, and input output processing unit 50 are connected for data exchange via the bus 42.

The first liquid crystal display unit 22a and second liquid crystal display unit 32 are each formed using a publicly known liquid crystal display panel. The image processing unit 48 includes a VRAM. The image processing unit 48 renders an image into the VRAM according to an instruction from the microprocessor 44. The image rendered into the VRAM is displayed at a predetermined time on the first liquid crystal display unit 22a or second liquid crystal display unit 32.

The input output processing unit 50 is an interface for use by the microprocessor 44 to exchange data with the touch panel 22b, operating key portion 24, memory card slot 26, sound processing unit 52, and communication interface 54. The touch panel 22b, operating key portion 24, memory card slot 26, sound processing unit 52, and communication interface 54 are connected to the input output processing unit 50.

The operating key portion 24 is an input means for use by a user to input an operation. The operating key portion 24 comprises a cross button 24c, and buttons 24a, 24b, 24x, 24y, 24l, 24r. The input output processing unit 50 scans the states of the respective units of the operating key portion 24 every constant cycle (e.g., every 1/60$^{th}$ of a second), and outputs an operational signal indicating a scanning result to the microprocessor 44 via the bus 42. The microprocessor 44 determines the content of an operation carried out by a user, based on the operational signal. The touch panel 22b also is an input means for use by a user to input an operation. The touch panel 22b supplies pressed position information according to a position pressed by a user to the microprocessor 44 via the input output processing unit 50. The microprocessor 44 determines the position pressed by the user on the touch panel 22b, based on the pressed position information.

The memory card slot 26 reads a game program and game data stored in the game memory card 40. The game memory card 40 includes a ROM to store a game program and game data, and EEPROM to store game data such as e.g., saved data or the like. Note that although a game memory card 40 is used here to provide a game program and game data to the game device 10, other information storage medium, such as an optical disc or the like, may be used. Also, a game program and game data may be provided via a communication network, such as the Internet, or the like from a remote place to the game device 10. Alternatively, various data communications, such as infrared-ray communication or the like, may be used to supply a game program and/or game data to the game device 10.

The sound processing unit 52 includes a sound buffer. The sound processing unit 52 outputs via the speaker 34 various sound data read from the game memory card 40 to the sound buffer. The communication interface 54 is an interface for connecting the game device 10 to the communication network.

In the game device having the above described structure, a music-oriented game in which a player carries out game operation in accordance with game music is carried out. This game is realized by the microprocessor 44 by executing a game program stored in the game memory card 40.

The above described game begins when reproduction of game music begins, and ends when the reproduction of game music ends.

Figure 4:
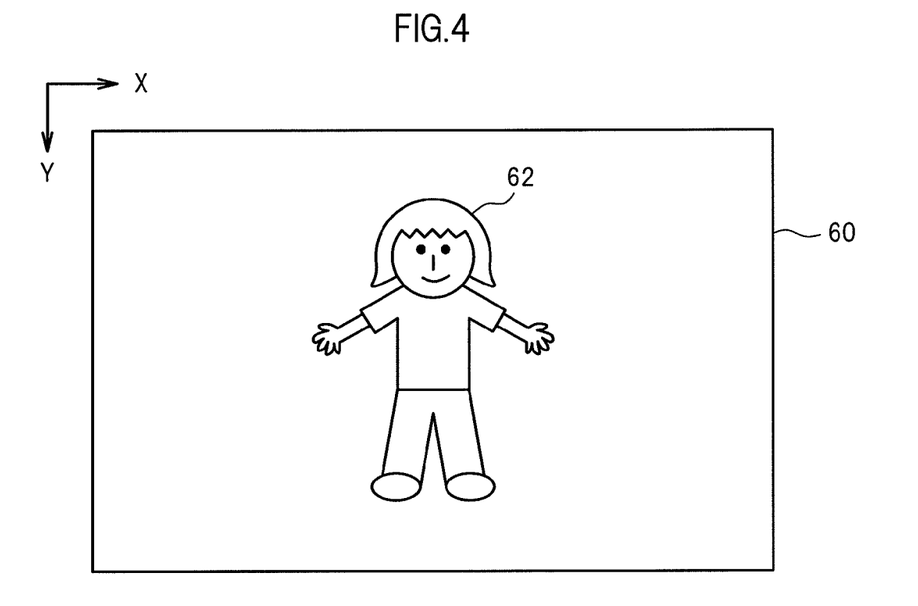
FIG. 4 is a diagram showing one example of a game screen.

Initially, a game screen will be described. FIGS. 4 to 9 show examples of a game screen to be displayed on the touch screen 22. Note that the following description is based on the assumption that the horizontal direction of the game screen 60 is defined as the X axis and the vertical direction of the game screen 60 is defined as the Y axis, as shown in FIG. 4.

FIG. 4 shows a game screen 60 to be shown when a game begins. As shown, a game character 62 is displayed at the middle of the game screen 60. The game character 62 performs various dance motions in accordance with game music. A dance motion may include, e.g., moving an arm according to a predetermined pattern, performing dance steps, and so forth.

Figure 5:
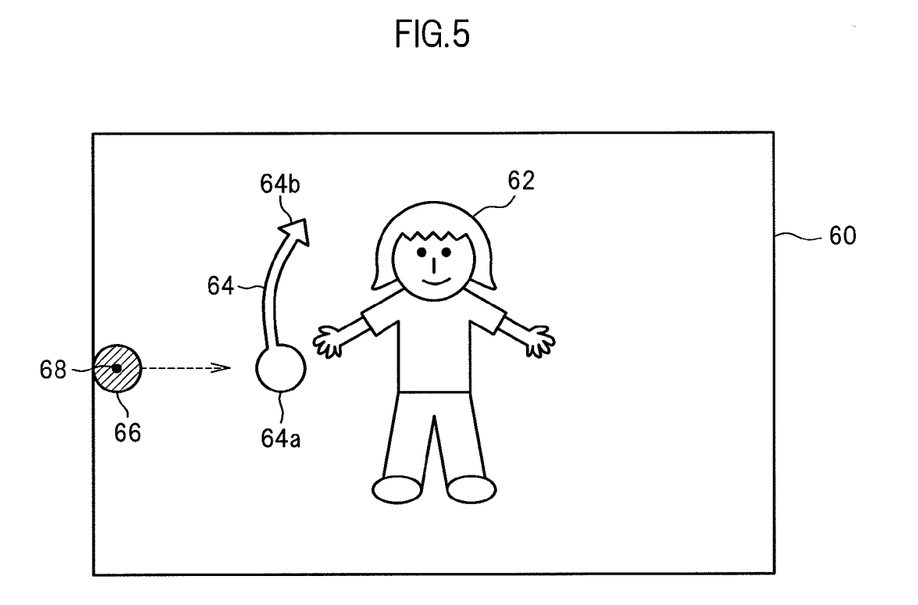
FIG. 5 is a diagram showing one example of a game screen.

As a time at which the game character 62 performs a predetermined dance motion approaches, an arrow image 64 (a trajectory image) and a moving image 66 appear in the game screen 60, as shown in FIG. 5.

The arrow image 64 is an image corresponding to a dance motion of the game character 62. In detail, the arrow image 64 corresponds to a motion of a predetermined part (e.g., arm or leg) of a body of the game character 62 performing a dance motion. For example, the arrow image 64 shown in FIG. 5 corresponds to a motion of the game character 62 raising its extending right arm relatively slowly. Note that the start point 64a of the arrow image 64 is round in this embodiment. The arrow image 64 is shown in a position based on the position of the body part (e.g., arm or leg) related to the dance motion corresponding to the arrow image 64. As the arrow image 64 shown in FIG. 5 corresponds to the motion of the right arm and hand of the game character 62, the arrow image 64 is shown in a position based on the right arm and hand of the game character 62.

The moving image 66 is an image moving within the game screen 60. In this embodiment, the moving image 66 is round, though the moving image 66 may have any shape other than a round. The initial position 68 of the moving image 66 is set at a position based on the display position of the arrow image 64. Specifically, with the start point 64a of the arrow image 64 located in the left half of the game screen 60, the initial position 68 of the moving image 66 is set in the vicinity of the left end of the game screen 60. For example, in the game screen 60 shown in FIG. 5, the initial position 68 of the moving image 66 is set at a position displaced from the start point 64a of the arrow image 64 in the X axis negative direction (left direction) and in the vicinity of the boundary of the game screen 60. That is, the Y coordinate of the initial position 68 of the moving image 66 is the same as that of the center of the start point 64a of the arrow image 64.

The moving image 66 in the initial position 68 moves at a constant speed toward the start point 64a of the arrow image 64. In the game screen 60 shown in, e.g., FIG. 5, the moving image 66 moves rightward (in the X axis positive direction) as indicated by the dotted arrow. As the Y coordinate of the initial position 68 of the moving image 66 is the same as that of the center of the start point 64a of the arrow image 64, as described above, the moving image 66 moves horizontally to the start point 64a of the arrow image 64. Note that the dotted arrow shown in FIG. 5 is not actually shown in the game screen 60.

Figure 6:
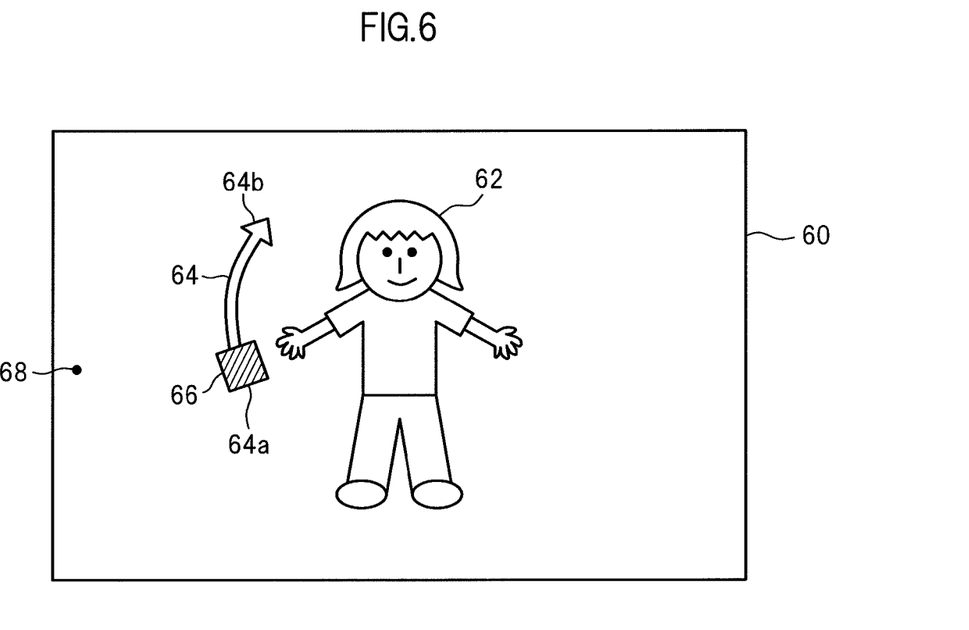
FIG. 6 is a diagram showing one example of a game screen.

At a time when the game character 62 begins the above described dance motion, the moving image 66 reaches the start point 64a of the arrow image 64. As shown in FIG. 6, with the moving image 66 having reached the start point 64a of the arrow image 64, the moving image 66 is transformed from round to quadrilateral. Note that the moving image 66 may be transformed into any shape other than quadrilateral, e.g., a star shape.

Figure 7:
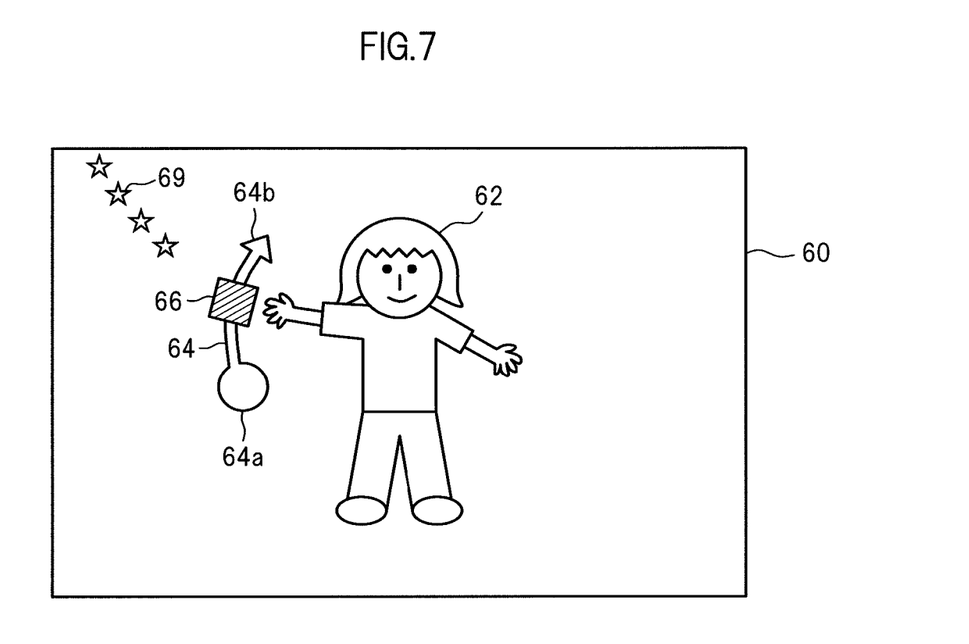
FIG. 7 is a diagram showing one example of a game screen.

At a time when the moving image 66 reaches the start point 64a of the arrow image 64, the game character 62 begins a dance motion, and the moving image 66 accordingly starts moving along the arrow image 64 toward the end point 64b. FIG. 7 shows the game screen 60 in the above described situation. That is, as shown in FIG. 7, the game character 62 begins a motion of raising its right hand relatively slowly. Also, in synchronism with the motion of the right hand of the game character 62, the moving image 66 moves at a constant speed along the arrow image 64 toward the end point 64b.

Note that, although the start point 64a of the arrow image 64 is shown apart from the right hand of the game character 62 in FIGS. 5 and 6, the start point 64a of the arrow image 64 may be shown on the right hand of the game character 62. Also, although the arrow image 64 is shown apart from the trajectory to be followed by the right hand of the game character 62 in FIG. 7, the arrow image 64 may be shown overlapping the trajectory to be followed by the right hand of the game character 62. That is, the right hand of the game character 62 may move along the arrow image 64. When the moving image 66 moves on the arrow image 64, the moving image 66 may be shown overlapping the right hand of the game character 62.

At a time when the game character 62 finishes the above described dance motion, the moving image 66 reaches the end point 64b of the arrow image 64. With the moving image 66 having reached the end point 64b of the arrow image 64, the arrow image 64 and moving image 66 disappear from the game screen 60. Again, when a time when the game character 62 begins a predetermined dance motion approaches, the arrow image 64 and moving image 66 appear in the game screen 60, and the above described process is repeated until the game ends.

Figure 8:
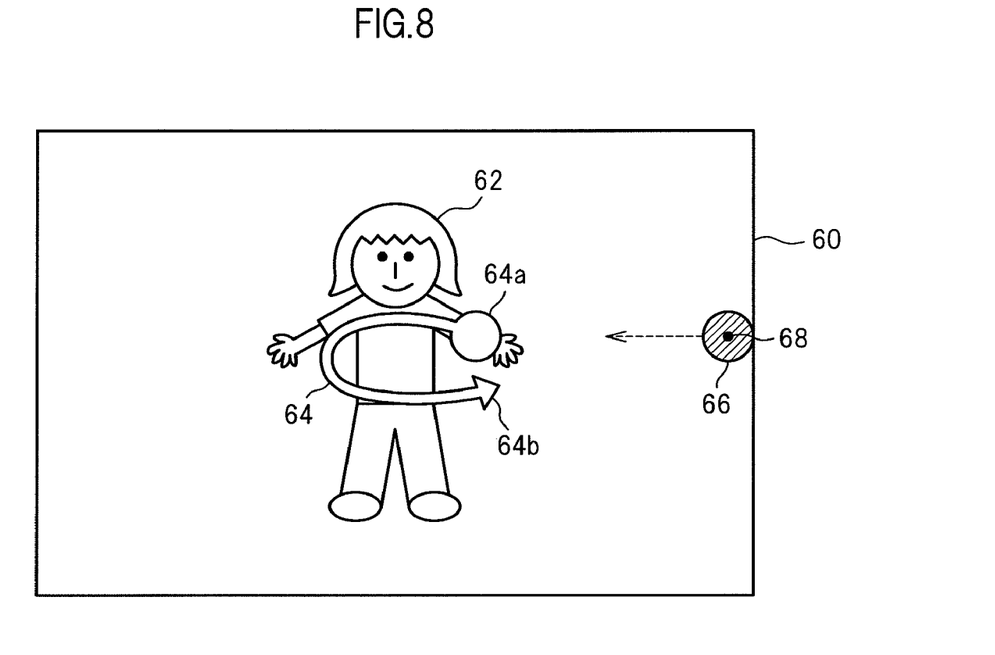
FIG. 8 is a diagram showing one example of a game screen.
Figure 9:
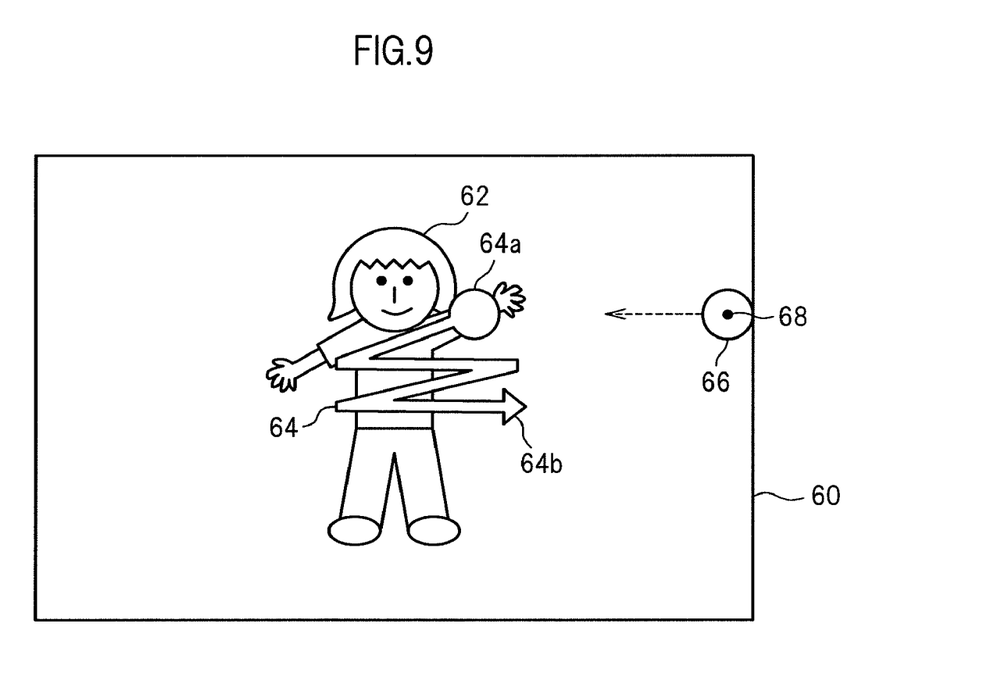
FIG. 9 is a diagram showing one example of a game screen.

It should be noted that the arrow image 64 is not limited to the arrow image 64 shown in FIG. 5 to FIG. 7. Arrow images 64 corresponding to various dance motions which the game character 64 could possibly perform are prepared. FIGS. 8 and 9 show other examples of the arrow image 64.

Specifically, the arrow image 64 shown in FIG. 8 corresponds to a dance motion of the game character 62, of moving its left arm relatively slowly along an oval trajectory. As a time when the game character 62 begins this dance motion approaches, this arrow image 64 and moving image 66 appear in the game screen 60, as shown in FIG. 8.

The arrow image 64 shown in FIG. 9 corresponds to a motion of the game character 62, of waving its left hand in the right and left directions relatively fast. As a time when the game character 62 begins this dance motion approaches, this arrow image 64 and moving image 66 appear in the game screen 60, as shown in FIG. 9.

In the game screens 60 shown in FIGS. 8 and 9, in which the start point 64a of the arrow image 64 is located in the right half of the game screen 60, the initial position 68 of the moving image 66 is set in the vicinity of the right end of the game screen 60. Similar to the game screens 60 shown in FIG. 5 to FIG. 7, the moving image 66 also moves from the initial position 68 to the start point 64a of the arrow image 64 in the game screens 60 shown in FIGS. 8 and 9. That is, the moving image 66 moves leftward (the X axis negative direction), then reaches the start point 64a of the arrow image 64 at a time when the game character 62 begins the above described dance motion, and is transformed into a quadrilateral. With the moving image 66 having reached the start point 64a of the arrow image 64, the game character 62 begins the above described dance motion, and the moving image 66 accordingly starts moving along the arrow image 64 to the end point 64b in synchronism with the motion of the left hand of the game character 62. Note that, similar to FIGS. 5 and 6, the start point 64a of the arrow image 64 may also be displayed on the left hand of the game character 62 in FIGS. 8 and 9. When the moving image 66 moves on the arrow image 64, the moving image 66 may be displayed overlapping the left hand of the game character 62.

In the above described game screen 60, a player carries out a sliding operation with a touch-pen or the like in accordance with the dance motion of the game character 62. That is, the player presses an area within the displayed moving image 66 with a touch-pen or the like at a time when the moving image 66 becomes overlapped on the start point 64a of the arrow image 64 (see FIG. 6). Thereafter, the player slides the tip end of the touch pens on the touch panel 22b, following the movement of moving image 66, to thereby keep pressing the area within the displayed moving image 66.

When the player keeps pressing an area within the displayed moving image 66 during a period with the moving image 66 moving along the arrow image 64, a star image 69, such as is shown in FIG. 7, will appear. The game performance (a score or the like) of a player is determined based on the number of star images 69 produced during the game. In order to gain a higher game performance, a player aims to have as many star images 69 as possible appear.

In the above described game, a player can enjoy a sense of feeling that the player instructs the game character 62 to perform a dance motion through a sliding operation with a touch-pen or the like.

It should be noted that as a time to begin a sliding operation (a pressing operation) is indicated to a player by showing the moving image 66 moving toward the start point 64a of the arrow image 64 in this embodiment, the player can know the time at a glance. Also, the arrow image 64 itself indicates the trajectory (a reference trajectory) to be followed by the moving image 66 having reached the start point 64a. That is, as a trajectory for a sliding operation to be carried out by a player is indicated, the player can know the trajectory for a sliding operation which the player is to carry out. Further, as the shape of the moving image 66 is different between when the moving image 66 is moving toward the start point 64a of the arrow image 64 and when the moving image 66 is moving along the arrow image 64, a player can know at a glance whether the moving image 66 is currently moving toward the start point 64a of the arrow image 64 or moving along the arrow image 64.

It should be noted that the speed of the moving image 66 moving toward the start point 64a of the arrow image 64 is set in consideration of the tempo of game music and remains constant throughout the game. Meanwhile, the speed of the moving image 66 moving along the arrow image 64 is not always identical to that of the moving image 66 moving toward the start point 64a of the arrow image 64, and is rather set in accordance with the speed of the dance motion performed by the game character 62. As the dance motion corresponding to the arrow image 64 shown in FIG. 5 to FIG. 7 or FIG. 8 is relatively slow, as described above, the moving image 66 moves relatively slowly along the arrow image 64 shown in FIG. 5 to FIG. 7 or FIG. 8. Meanwhile, as the dance motion corresponding to the arrow image 64 shown in FIG. 9 is relatively fast, the moving image 66 moves relatively fast along the arrow image 64 in FIG. 9.

As described above, in this embodiment, the moving image 66 moves along the arrow image 64 at different speeds. Regarding this point, the moving image 66 is shown in a color corresponding to the speed of the moving image 66 moving along the arrow image 64 in this embodiment. That is, e.g., the moving image 66 is shown blue in the game screen 60 (the game screen 60 shown in FIG. 5 to FIG. 8) in which the moving image 66 moves relatively slowly along the arrow image 64, and white in the game screen 60 (the game screen 60 shown in FIG. 9) in which the arrow image 64 moves relatively fast. In this embodiment, the color of the moving image 66 indicates the speed of the moving image 66 moving along the arrow image 64, as described above. With this arrangement, a player can anticipate the speed of the moving image 66 when the moving image 66 moves along the arrow image 64, by referring to the color of the moving image 66 moving toward the start point 64a of the arrow image 64.

Figure 10:
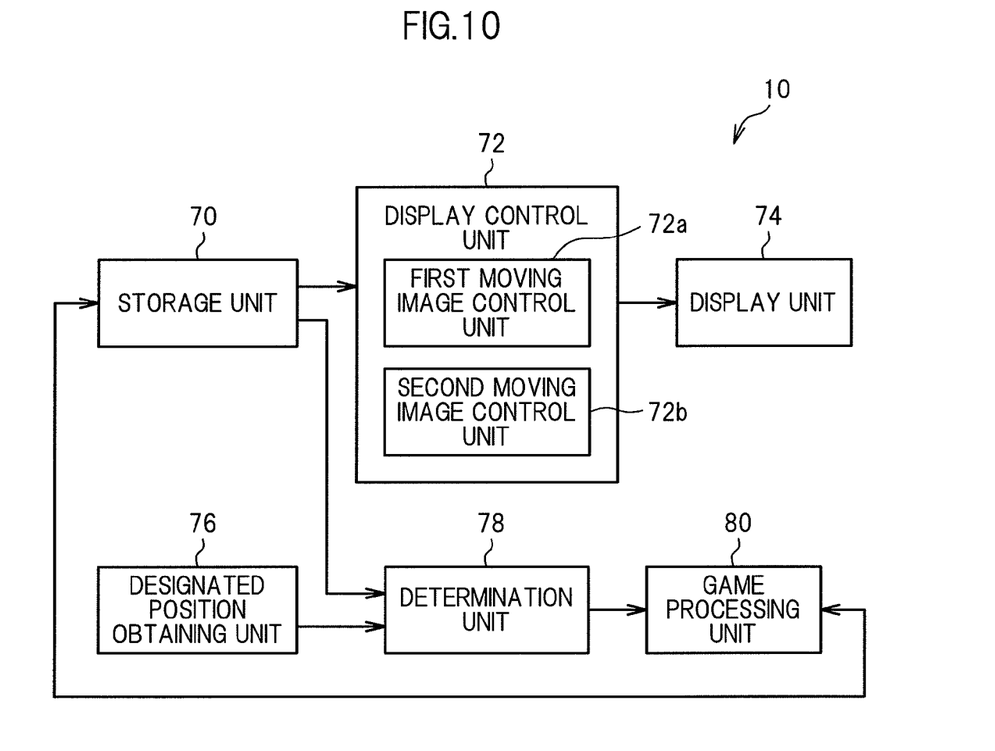
FIG. 10 is a functional block diagram of the game device.

In the following, a structure for realizing the above described game will be described. FIG. 10 shows a functional block according to the present invention among those realized in the game device 10. As shown in FIG. 10, the game device 10 comprises a storage unit 70, a display control unit 72, a display unit 74, a designated position obtaining unit 76, a determination unit 78, and a game processing unit 80. These function blocks are realized by the microprocessor 44 by executing a program stored in the game memory card 40.

The storage unit 70 is realized using, e.g., the game memory card 40 or main memory 46. The storage unit 70 stores data for realizing the above described game. For example, data (A) to (E) mentioned below are stored in the storage unit 70.

(A) Game music data
(B) Game character data
(C) Image data of the arrow image 64, moving image 66, and star image 69
(D) Display control data for the arrow image 64 and moving image 66
(E) Production condition data for the star image 69

The game character data is data for displaying the game character 62 in the game screen 60. In this embodiment, to display the game character 62 in the game screen 60, a virtual three dimensional space in which the game character 62 (a game character object) is placed is created in the main memory 46. Then, an image showing a picture obtained by viewing the virtual three dimensional space (the game character 62) from a virtual camera (a given viewpoint) is produced, and the resultant image is shown in the game screen 60. For this purpose, data (B1) and (B2), mentioned below, is stored as game character data.

(B1) Model data indicating the shape of the game character 62
(B2) Motion data for the game character 62

It should be noted that the motion data is data that defines a motion of the game character 62 in a game. In other words, the motion data is data that defines change in posture of the game character 62 in respective frames. Motion data is set such that the game character 62 performs various dance motions in accordance with game music. In the following, having the game character 62 move according to motion data is referred to as "reproducing motion data". It should be noted that the following description is based on the assumption that the frame rate is $\frac{1}{60}^{th}$ of a second. Also it is assumed in the following that there are N number of frames in total in a game. In this case, motion data defines change in posture of the game character 62 in each of the first to $N^{th}$ frames.

As image data of the arrow image 64, image data about the arrow image 64 corresponding to each of the various dance motions which the game character 62 could possibly perform is stored. For example, image data of the arrow image 64 shown in FIG. 5 to FIG. 7, arrow image 64 shown in FIG. 8, and arrow image 64 shown in FIG. 9 are stored. Further, as image data of the moving image 66, image data of, e.g., a blue round moving image 66 (see FIGS. 5 and 8), a blue quadrilateral moving image 66 (see FIGS. 6 and 7), a white round moving image 66 (see FIG. 9), and a white quadrilateral moving image 66 are stored.

Display control data for the arrow image 64 and moving image 66 is data for controlling display of the arrow image 64 and moving image 66. This display control data includes, e.g., data (D1) to (D3) mentioned below.

(D1) Data indicating a time to begin or end display of the arrow image 64 and moving image 66
(D2) Data indicating the kind and display position of the arrow image 64
(D3) Data indicating a display manner (shape, color, and so forth) and a movement trajectory of the moving image 66

It should be noted that a time to begin or end display of the arrow image 64 and moving image 66 is indicated as, e.g., the number of frames present after a predetermined reference time. Note that "reference time" refers to, e.g., a time to begin a game or reproduction of game music. Note that the above described time may be indicated using other information. For example, a measure of game music may be divided into a predetermined number of beats (e.g., four or eight beats) and the above described time indicated using a measure and a beat.

Figure 11:
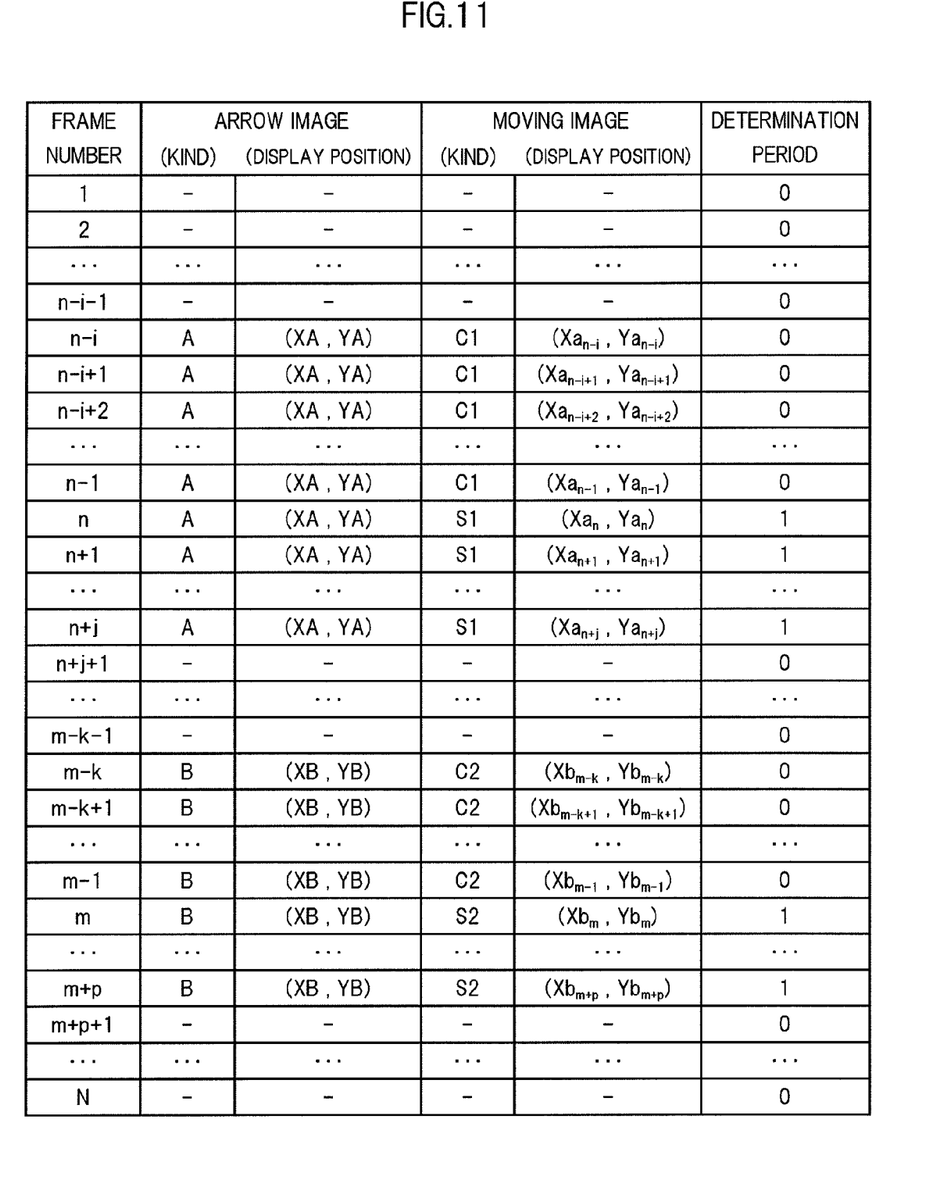
FIG. 11 is a diagram showing an example of display control data for an arrow image and a moving image.

FIG. 11 shows one example of display control data for the arrow image 64 and moving image 66. The display control data is set such that, e.g., display of the arrow image 64 and moving image 66 in the game screen 60 begins when a time when the game character 62 begins a predetermined dance motion approaches. Further, the display control data is set such that, the moving image 66, after having moved at a constant speed from the initial position 68 to the start point 64a of the arrow image 64, moves at a constant speed along the arrow image 64 to the end point 64b in synchronism with the dance motion of the game character 62. The display control data shown in FIG. 11 includes "frame number", "arrow image", "moving image", and "determination period" fields.

It is assumed here that the game character 62 begins a dance motion corresponding to the arrow image 64 shown in FIG. 5 to FIG. 7 in the $n^{th}$ frame, and the dance motion is completed in the $(n+j)^{th}$ frame. It is also assumed that the game character 62 begins a dance motion corresponding to the arrow image 64 shown in FIG. 8 in the $m^{th}$ frame, and the dance motion is completed in the $(m+p)^{th}$ frame.

Note that the "frame number" field indicates that the frame in question is the $N^{th}$ frame after the game starts. For example, with a frame rate being $\frac{1}{60}^{th}$ of a second, the $n^{th}$ frame corresponds to a time after elapse of $n/60^{th}$ of a second after the game starts. Therefore, the "frame number" field can be considered as information indicating a time in a game. Note that the lower the "frame number" fields goes in FIG. 11, the larger the value in the "frame number" field becomes.

The "arrow image" field indicates the kind and display position of the arrow image 64 displayed in each frame. In the "arrow image" field in FIG. 11, e.g., "A" refers to identification information of the arrow image 64 shown in FIG. 5 to FIG. 7, and "B" refers to identification information of the arrow image 64 shown in FIG. 9. Note that "-" indicates that no arrow image 64 is shown in the game screen 60. "Display position" indicates the coordinates of a representative point of the arrow image 64. For example, the coordinates (XA, YA) are set such that the arrow image 64 is shown in the display position of the arrow image 64 shown in FIG. 5 to FIG. 7, and the coordinates (XB, YB) are set such that the arrow image 64 is shown in the display position of the arrow image 64 shown in FIG. 9. According to the display control data shown in FIG. 11, display of the arrow image 64 shown in FIG. 5 to FIG. 7 in the game screen 60 begins in the $(n-i)^{th}$ frame. The $(n-i)^{th}$ frame corresponds to a time (the $n^{th}$ frame) at which the game character 62 begins a dance motion corresponding to the arrow image 64 shown in FIG. 5 to FIG. 7 approaching. Then, according to the display control data shown in FIG. 11, the arrow image 64 shown in FIG. 5 to FIG. 7 is kept displayed in the game screen 60 until the $(n+j)^{th}$ frame, and disappears from the game screen 60 in the $(n+j+1)^{th}$ frame. The $(n+j)^{th}$ frame corresponds to with the time when the game character 62 completes the above described dance motion. Similarly, according to the display control data shown in FIG. 11, display of the arrow image 64 shown in FIG. 9 in the game screen 60 begins in the $(m-k)^{th}$ frame. The $(m-k)^{th}$ frame corresponds to a time (the $m^{th}$ frame) at which the game character 62 begins a dance motion corresponding to the arrow image 64 shown in FIG. 9 approaching. Then, according to the display control data shown in FIG. 11, the arrow image 64 shown in FIG. 9 is kept displayed in the game screen 60 until the $(m+p)^{th}$ frame, and disappears from the game screen 60 in the $(m+p+1)^{th}$ frame. The $(m+p)^{th}$ frame corresponds in time with the game character 62 completing the above described dance motion. The "arrow image" field specifies a time to begin or end display of the arrow image 64.

The "moving image" field indicates the kind and display position of the moving image 66 to be displayed in each frame. "-" indicates that no moving image 66 is shown in the game screen 60. The "display position" indicates the coordinates of a representative point (e.g., the center) of the moving image 66.

In the "moving image" field shown in FIG. 11, e.g., "C1" refers to identification information of a blue round moving image 66 (see FIG. 5), and "S1" refers to identification information of a blue quadrilateral moving image 66 (see FIGS. 6 and 7). The coordinates $(Xa_{n-i}, Ya_{n-i})$ of the display position in the $(n-i)^{th}$ frame are the same as those of the initial position 68 shown in FIG. 5 to FIG. 7, and the coordinates $(Xa_n, Ya_n)$ of the display position in the $n^{th}$ frame are the same as those of the center of the start point 64a of the arrow image 64 shown in FIG. 5 to FIG. 7. The coordinates of the display position in each of the $(n-i)^{th}$ frame to the $n^{th}$ frame are set such that the moving image 66 moves from the initial position 68 shown in FIG. 5 to FIG. 7 to the start point 64a of the arrow image 64 shown in FIG. 5 to FIG. 7 at a constant speed. The coordinates $(Xa_{n+j}, Ya_{n+j})$ of the display position in the $(n+j)^{th}$ frame are the same as those of the center of the end point 64b of the arrow image 64 shown in FIG. 5 to FIG. 7. The coordinates of the display position in each of the nth frame to the $(n+j)^{th}$ frame are set such that the moving image 66 moves along the arrow image 64 shown in FIG. 5 to FIG. 7 from the start point 64a to the end point 64b in synchronism with the dance motion of the game character 62. According to the display control data shown in FIG. 11, display of a blue round moving image 66 in the game screen 60 begins in the $(n-i)^{th}$ frame (see FIG. 5). The $(n-i)^{th}$ frame corresponds to a time (the $n^{th}$ frame) when the game character 62 begins a dance motion corresponding to the arrow image 64 shown in FIG. 5 to FIG. 7 approaching. Thereafter, the moving image 66 moves from the initial position 68 to the start point 64a of the arrow image 64 during a period from the $(n-i)^{th}$ frame to the nth frame (see FIG. 5). Then, the moving image 66 reaches the start point 64a of the arrow image 64 in the $n^{th}$ frame, upon which the moving image 66 is transformed from round to quadrilateral (see FIG. 6). The $n^{th}$ frame corresponds to a time when the game character 62 begins a dance motion corresponding to the arrow image 64 shown in FIG. 5 to FIG. 7. Thereafter, during a period until the $(n+j)^{th}$ frame, a blue quadrilateral arrow image 64 moves along the arrow image 64 to the end point 64b in synchronism with the dance motion of the game character 62 (see FIG. 7).

Also, in the "moving image" field shown in FIG. 11, e.g., "C2" refers to identification information of a white round moving image 66 (see FIG. 9), and "S2" refers to identification information of a white quadrilateral moving image 66. The coordinates $(Xb_{m-k}, Yb_{m-k})$ of the display position in the $(m-k)^{th}$ frame are the same as those of the initial position 68 shown in FIG. 9, and the coordinates $(Xb_m, Yb_m)$ of the display position in the $m^{th}$ frame are the same as those of the center of the start point 64a of the arrow image 64 shown in FIG. 9. The coordinates of the display position in each of the $(m-k)^{th}$ frame to the $m^{th}$ frame are set such that the moving image 66 moves from the initial position 68 shown in FIG. 9 to the start point 64a of the arrow image 64 shown in FIG. 9 at a constant speed. The coordinates $(Xb_{m+p}, Yb_{m+p})$ of the display position in the $(m+p)^{th}$ frame are the same as those of the center of the end point 64b of the arrow image 64 shown in FIG. 9. The coordinates of the display position in the $m^{th}$ frame to the $(m+p)^{th}$ frame are set such that the moving image 66 moves along the arrow image 64 shown in FIG. 9 from the start point 64a to the end point 64b in synchronism with the dance motion of the game character 62. According to the display control data shown in FIG. 11, display of a white round moving image 66 in the game screen 60 begins in the $(m-k)^{th}$ frame (see FIG. 9). The $(m-k)^{th}$ frame corresponds to a time (the $m^{th}$ frame) when the game character 62 begins a dance motion corresponding to the arrow image 64 shown in FIG. 9 approaching. Thereafter, during a period from the $(m-k)^{th}$ frame to the $m^{th}$ frame, the moving image 66 moves from the initial position 68 to the start point 64a of the arrow image 64 (see FIG. 9). Then, in the $m^{th}$ frame, the moving image 66 reaches the start point 64a of the arrow image 64, at which point the moving image 66 is transformed from round to quadrilateral. The $m^{th}$ frame corresponds to a time when the game character 62 begins a dance motion corresponding to the arrow image 64 shown in FIG. 9. Thereafter, during a period until the $(m+p)^{th}$ frame, a white quadrilateral arrow image 64 moves along the arrow image 64 to the end point 64b in synchronism with the dance motion of the game character 62.

As described above, the "moving image" field specifies a time to begin or end display of the moving image 66. A display manner (shape, color, and so forth) and movement trajectory of the moving image 66 in the game screen 60 are also specified.

The "determination period" field indicates whether or not the frame is included in a period (a determination period) in which whether or not a player presses an area within the displayed moving image 66 is determined. The value "0" indicates that the frame is not included in a determination period, and the value "1" indicates that the frame is included in a determination period. In this embodiment, the determination period coincides with a period in which moving image 66 is moving along the arrow image 64 from the start point 64a to the end point 64b.

Production state data for the star image 69 is data for a situation in which the star image 69 is produced. Production state data for the star image 69 includes, e.g., data (E1) and (E2) mentioned below.

(E1) The number of star images 69 having been produced after the game starts up to the present (E2) The current position of the star image 69 shown in the game screen 60

The display control unit 72 is realized mainly using, e.g., the microprocessor 44 and image processing unit 48. The display unit 74 is realized using, e.g., the first liquid crystal display unit 22a. The display control unit 72 displays the game screen 60 on the display unit 74.

The display control unit 72 comprises a first moving image control unit 72a and a second moving image control unit 72b. The first moving image control unit 72a controls such that the moving image 66 moves from the initial position 68 to the start point of a reference trajectory. It should be noted that in this embodiment, the trajectory indicated by the arrow image 64 (a trajectory presented by the arrow image 64) corresponds to a "reference trajectory", and the start point 64a of the arrow image 64 corresponds to the "start point of the reference trajectory". In this embodiment, the first moving image control unit 72a displays the moving image 66 in the game screen 60 according to the display control data stored in the storage unit 70 (see FIG. 11), to thereby move the moving image 66 from the initial position 68 to the start point of the reference trajectory. Meanwhile, the second moving image control unit 72b controls such that the moving image 66, after having reached the start point of the reference trajectory, moves along the reference trajectory. In this embodiment, the second moving image control unit 72b displays the moving image 66 in the game screen 60 according to the display control data (see FIG. 11) stored in the storage unit 70, to thereby move the moving image 66 along the reference trajectory.

The designated position obtaining unit 76 is realized mainly using, e.g., the microprocessor 44 and touch panel 22*b*. The designated position obtaining unit 76 obtains a position designated by a player within the game screen 60. In this embodiment, the position pressed by a player on the touch panel 22*b* is obtained as a position designated by the player in the game screen 60.

The determination unit 78 is realized mainly using, e.g., the microprocessor 44. The determination unit 78 determines, during a period in which the moving image 66 is moving along the reference trajectory, whether or not the position obtained by the designated position obtaining unit 76 is within an area based on the position of the moving image 66. Note that "an area based on the position of the moving image 66" refers to an area set based on the position of the moving image 66, being, e.g., an area where the moving image 66 is displayed within the game screen 60.

The game processing unit 80 is realized mainly using, e.g., the microprocessor 44. The game processing unit 80 carries out a game process, based on the result of determination made by the determination unit 78. In this embodiment, when it is determined, during a period in which the moving image 66 is moving along the reference trajectory, that the position obtained by the designated position obtaining unit 76 is within an area based on the position of the moving image 66, the game processing unit 80 carries out a process for producing the star image 69.

Figure 12:
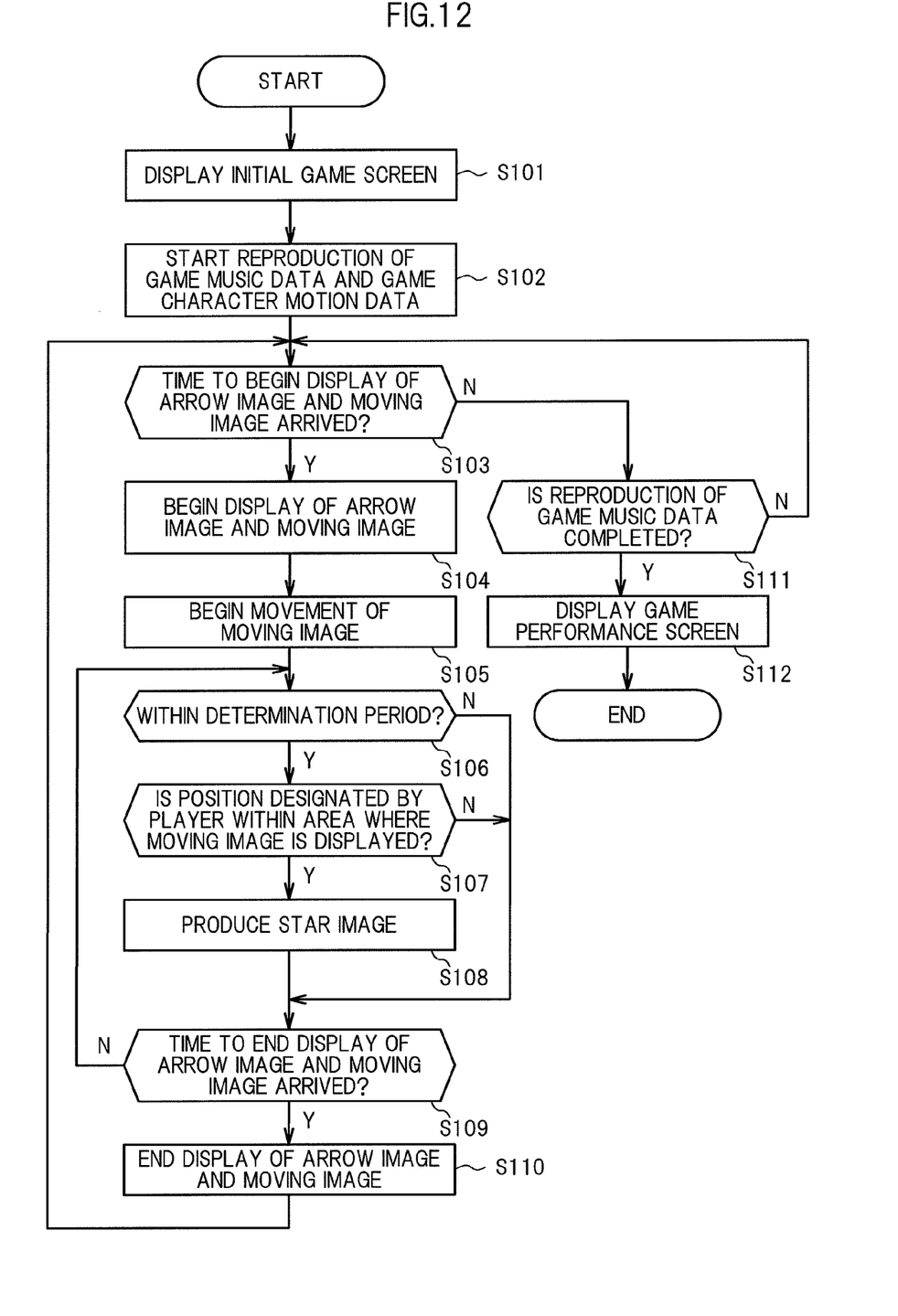
FIG. 12 is a flowchart of a process to be carried out by the game device.

In the following, a process to be carried out by the game device 10 to realize the above described function block will be described. FIG. 12 is a flowchart of a process to be carried out by the game device 10. The microprocessor 44 carries out the process shown in FIG. 12 according to a program stored in the game memory card 40.

As shown in FIG. 12, initially, the microprocessor 44 displays an initial game screen 60 (see FIG. 4) on the first liquid crystal display unit 22*a* (S101), and then begins reproduction of game music data and motion data of the game character 62 (S102). Thereafter, the game character 62 shown in the game screen 60 moves according to the motion data.

Then, the microprocessor 44 monitors to see whether or not a time at which to begin display of the arrow image 64 and moving image 66 has arrived (S103). For example, according to, e.g., the display control data shown in FIG. 11, as the kind of the arrow image 64 or moving image 66 is changed from "-" to "A" or "C1" in the (n−i)$^{th}$ frame, it is determined that the above described time has arrived in the (n−i)$^{th}$ frame. Similarly, as the kind of the arrow image 64 or moving image 66 is changed from "-" to "B" or "C2" in the (m−k)$^{th}$ frame, it is determined that the above described time has arrived in the (m−k)$^{th}$ frame.

With determination of the arrival of a time at which to begin display of the arrow image 64 and moving image 66, the microprocessor 44 (the display control unit 72) begins display of the arrow image 64 and moving image 66 (S104). The kind or display position of the arrow image 64 is specified based on the display control data (see FIG. 11). The kind (display manner) or initial position of the moving image 66 is also specified based on the display control data (see FIG. 11). Then, the microprocessor 44 (the first moving image control unit 72*a* and second moving image control unit 72*b*) begins movement of the moving image 66 (S105). Thereafter, the display position of the moving image 66 is changed according to the display control data (see FIG. 11).

Thereafter, the processes from S106 to S109 are repeated every predetermined period of time (every $\frac{1}{60}^{th}$ of a second). That is, the microprocessor 44 determines whether or not the current frame is included in a determination period (S106), based on the "determination period" field of the display control data (see FIG. 11). When it is determined that the current frame is included in the determination period, the microprocessor 44 (the designated position obtaining unit 76 and determination unit 78) obtains the position designated by a player, and determines whether or not the designated position is within an area where the moving image 66 is displayed (S107). Then, when it is determined that the position designated by the player is within the area where the moving image 66 is displayed, the microprocessor 44 (the game processing unit 80) produces a new star image 69 (S108). In this case, production state data for the star image 69 is updated, and specifically, one is added to the number of star images 69 having been produced after the game starts up to the present.

After the processes S106 to S108 are carried out, the microprocessor 44 determines whether or not a time at which to end display of the arrow image 64 and moving image 66 has arrived (S109). For example, according to the display control data shown in FIG. 11, as the kind of the arrow image 64 or moving image 66 is changed to "-" in the (n+j+1)$^{th}$ frame, it is determined that the above described time has arrived in the (n+j+1)$^{th}$ frame. Similarly, as the kind of the arrow image 64 or moving image 66 is changed to "-" in the (m+p+1)$^{th}$ frame, it is determined that the above described time has arrived also in the (m+p+1)$^{th}$ frame.

When it is determined that a time at which to end the display of the arrow image 64 and moving image 66 have not arrived yet, the processes at S106 to S109 are repeated. Meanwhile, when it is determined that a time at which to end display of the arrow image 64 and moving image 66 arrives, the microprocessor 44 erases the arrow image 64 and moving image 66 from the game screen 60 (S110). In this case, the process at S103 is carried out.

Note that when it is determined in the process at S103 that a time at which to begin display of the arrow image 64 and moving image 66 has not arrived yet, the microprocessor 44 determines whether or not reproduction of the game music data is completed (S111). That is, whether or not the game ends is determined. When reproduction of the game music data is not completed yet, the process at S103 is carried out. Meanwhile, when reproduction of the game music data is completed, the microprocessor 44 displays the game performance screen on the first liquid crystal display unit 22*a* (S112), where, e.g., game performance of the player is shown. As described above, the game performance of a player is determined based on the number of star images 69 produced during the game.

In the above described game device 10, a player carries out a sliding operation in accordance with a dance motion performed by the game character 62, so that the player can enjoy the sense of feeling that the player instructs the game character 62 to perform a dance motion. In particular, in the game device 10, the moving image 66 moving toward the start point 64*a* of the arrow image 64 makes it easier for a player to realize a time at which to begin the sliding operation. Also, the arrow image 64 itself makes it easier for a player to realize a trajectory to input through a sliding operation.

In the game device 10, the moving speed of the moving image 66 moving along the arrow image 64 may be changed depending on the speed of the dance motion performed by the game character 62. In this regard, the color of the moving image 66 is changed depending on the moving speed of the moving image 66 moving along the arrow image 64 in the game device 10. With the above, a player can anticipate the speed of the moving image 66 when the moving image 66 moves along the arrow image 64, by referring to the color of the moving image 66 moving toward the start point 64a of the arrow image 64.

It should be noted that a display manner other than color of the moving image 66 moving toward the start point 64a of the arrow image 64 may be changed depending on the moving speed of the moving image 66 when the moving image moves along the arrow image 64. For example, the shape or degree of transparency of the moving image 66 moving toward the start point 64a of the arrow image 64 may be changed depending on the moving speed of the moving image 66 when the moving image 66 moves along the arrow image 64. Alternatively, the moving image 66 moving toward the start point 64a of the arrow image 64 may be made to blink or not blink depending on the moving speed of the moving image 66 when the moving image 66 moves along the arrow image 64. Still alternatively, the manner (e.g., color) of displaying the arrow image 64, instead of the moving image 66, may be set at a display manner corresponding to the moving speed of the moving image 66 when the moving image 66 moves along the arrow image 64. That is, the manner (e.g., color) of displaying the arrow image 64 may be changed depending on the moving speed of the moving image 66 when the moving image 66 moves along the arrow image 64.

Sill alternatively, the color of the moving image 66 moving toward the start point 64a of the arrow image 64 may be set at a color corresponding to the relationship between the moving speed of the moving image 66 moving toward the start point 64a of the arrow image 64 and the moving speed of the moving image 66 when the moving image 66 moves along the arrow image 64. For example, the color of the moving image 66 may be different among a case (1) in which the speed of the moving image 66 moving toward the start point 64a of the arrow image 64 is substantially identical to that of the moving image 66 when the moving image 66 moves along the arrow image 64, a case (2) in which the speed of the moving image 66 when the moving image 66 moves along the arrow image 64 is faster than that of the moving image 66 moving towards the start point 64a of the arrow image 64, and a case (3) in which the speed of the moving image 66 when the moving image 66 moves along the arrow image 64 is slower than that of the moving image 66 moving towards the start point 64a of the arrow image 64. With the above, a player can anticipate how the moving speed of the moving image 66 will change when the moving image 66 reaches the start point 64a of the arrow image 64, by referring to the color of the moving image 66 moving toward the start point 64a of the arrow image 64.

In this case also, a display manner other than color of the moving image 66 moving toward the start point 64a of the arrow image 64 may be changed depending on the relationship between the moving speed of the moving image 66 moving toward the start point 64a of the arrow image 64 and that of the moving image 66 when the moving image 66 moves along the arrow image 64. Alternatively, the manner (e.g., a color) of displaying the arrow image 64, instead of the moving image 66, may be set at a display manner corresponding to the relationship between the moving speed of the moving image 66 moving toward the start point 64a of the arrow image 64 and the moving speed of the moving image 66 when the moving image 66 moves along the arrow image 64. That is, the manner (e.g., a color) of displaying the arrow image 64 may be changed depending on the relationship between the moving speed of the moving image 66 moving toward the start point 64a of the arrow image 64 and that of the moving image 66 when the moving image 66 moves along the arrow image 64.

In the game device 10, in the case where the start point 64a of the arrow image 64 is displayed in the left half of the game screen 60, the initial position 68 of the moving image 66 is set in the vicinity of the left end of the game screen 60. Meanwhile, in the case where the start point 64a of the arrow image 64 is displayed in the right half of the game screen 60, the initial position 68 of the moving image 66 is set in the vicinity of the right end of the game screen 60. Here, assume that, e.g., the start point 64a of the arrow image 64 is displayed in the left half of the game screen 60 and the initial position 68 of the moving image 66 is set in the vicinity of the right end of the game screen 60. In this case, as the moving image 66 needs to traverse the middle portion of the game screen when moving from the initial position 68 to the start point 64a of the arrow image 64, the game character 62 displayed at the middle portion of the game screen 60 will be disturbed by the moving image 66, becoming not clearly seen. In the game device 10, the game character 62 is prevented from becoming not clearly seen due to the moving image 66 moving toward the start point 64a of the arrow image 64.

It should be noted that the present invention is not limited to the above described embodiment.

Figure 13:
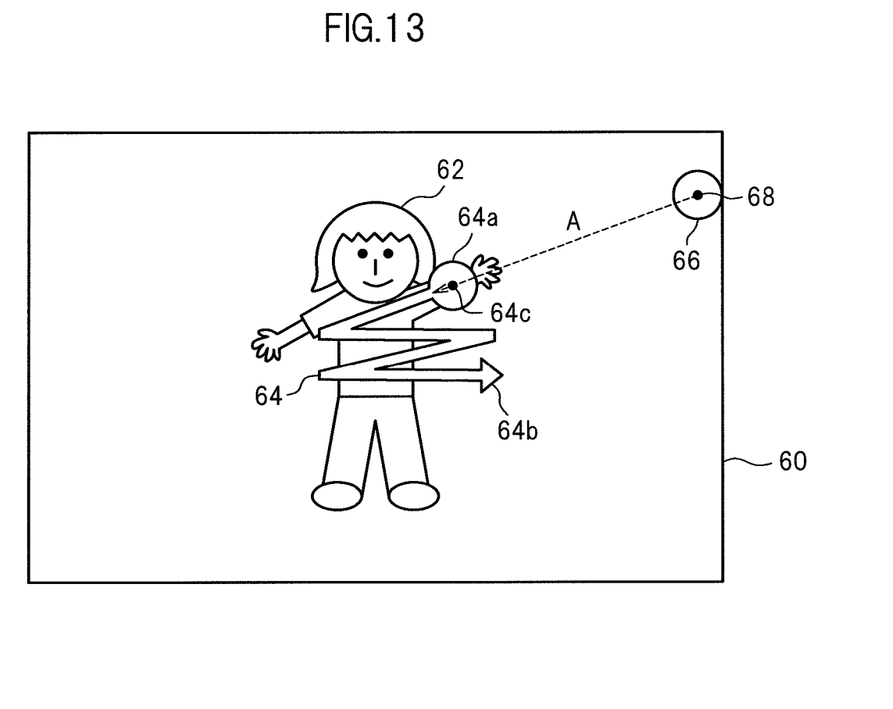
FIG. 13 is a diagram showing one example of a game screen.

For example, the initial position 68 of the moving image 66 may be set in consideration of the trajectory of the moving image 66 moving along the arrow image 64. FIG. 13 is a diagram showing another embodiment of the initial position 68 of the moving image 66. As shown in FIG. 13, the initial position 68 of the moving image 66 may be set such that the direction from the initial position 68 of the moving image 66 to the center 64c of the start point 64a of the arrow image 64 substantially coincides with the direction in which the moving image 66 having reached the start point 64a of the arrow image 64 initially moves from the start point 64a. This results in a more natural movement of the moving image 66.

Also, e.g., the speed of the moving image 66 moving towards the start point 64a of the arrow image 64 may be changed depending on the distance between the initial position of the moving image 66 and the start point 64a of the arrow image 64. When the distance is relatively large, the moving image 66 may move relatively fast. Meanwhile, when the distance is relatively short, the moving image 66 may move relatively slowly. Note that in this case, data that correlates this distance to the speed of the moving image 66 may be stored beforehand so that the speed of the moving image 66 may be set dynamically based on the data and the above described distance.

Figure 14:
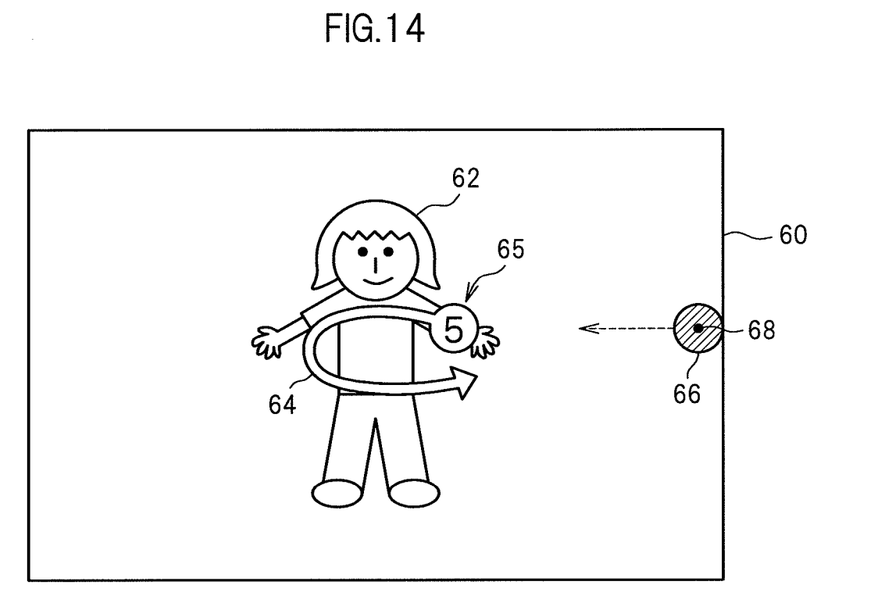
FIG. 14 is a diagram showing one example of a game screen.

Also, e.g., the moving image 66 may move along the arrow image 64 a number of times. That is, a player may be requested to perform a sliding operation more than once. FIG. 14 shows one example of the game screen 60 in this case. As shown, a number image 65 indicating the number of times the moving image 66 moves along the arrow image 64 may be displayed so as to be correlated to the arrow image 64 in the game screen 60 in this case. With the above, a player can readily know the number of times they need to carry out the sliding operation.

Also, e.g., the image of the game character 62 may not be produced using a three dimensional computer graphics technique. For example, a two dimensional animation image showing a picture in which the game character 62 performs a dance motion in accordance to game music is stored in advance, and then reproduced to thereby display the game character 62 in the game screen 60.

Also, e.g., a player may designate a position in the game screen 60, using an operation input means other than the touch panel 22b. For example, a mouse or a pointing device, such as is disclosed in JP3262677B, may be used.

Also, e.g., a game to be carried out on the game device 10 is not limited to a music-oriented game, and a game other than a music-oriented game may be carried out. For example, a game in which an opponent character is attacked in response to a player pressing the moving image 66 moving along the arrow image 64 may be carried out on the game device 10.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, comprising:
   a display unit for displaying a game screen including a game character having a part that moves a moving image moving within the game screen, and a trajectory image indicative of a reference trajectory that represents movement of the part of the game character;
   a designated position obtaining unit for obtaining a position within the game screen, the position being designated by a player;
   a first moving image control unit for moving the moving image from a given initial position toward a start point of the trajectory image indicative of the reference trajectory;
   a second moving image control unit, when the moving image reaches the start point of the reference trajectory represented as the trajectory image, for moving the moving image along the trajectory image indicative of the reference trajectory;
   a determination unit for determining whether the position obtained by the designated position obtaining unit is located within an area based on a position of the moving image during a period when the moving image is moving along the trajectory image indicative of the reference trajectory; and
   a game processing unit for carrying out a game process based on a result of determination made by the determination unit.

2. The game device according to claim 1, wherein a display manner for the moving image or the trajectory image when the moving image moves from the initial position to the start point of the reference trajectory is set based on a moving speed of the moving image along the trajectory image indicative of the reference trajectory.

3. The game device according to claim 2, wherein the display manner for the moving image or the trajectory image when the moving image moves from the initial position to the start point of the trajectory image indicative of the reference trajectory is based on a relationship between the moving speed of the moving image moving from the initial position to the start point of the trajectory image indicative of the reference trajectory, and the moving speed of the moving image along the reference trajectory.

4. The game device according to claim 1, wherein the initial position of the moving image is set based on a display position of the trajectory image.

5. The game device according to claim 1, wherein the initial position of the moving image is set based on the start point of the trajectory image that represents the reference trajectory and a movement direction in which the moving image moves after having reached the start point of the trajectory image that represents the reference trajectory.

6. The game device according to claim 1, wherein a moving speed of the moving image moving from the initial position to the start point of the reference trajectory is set at a moving speed corresponding to a distance between the initial position of the moving image and the start point of the trajectory image that represents the reference trajectory.

7. A control method for controlling a game device, comprising:
   a step of displaying a game screen including a game character having a part that moves, a moving image moving within the game screen,. and a trajectory image indicating a reference trajectory that represents movement of the part of the game character;
   a designated position obtaining step of obtaining a position within the game screen, the position being designated by a player;
   a first moving image control step of moving the moving image from a given initial position toward a start point of the trajectory image that indicates the reference trajectory;
   a second moving image control step, when the moving image reaches the start point of the trajectory image that indicates the reference trajectory, of moving the moving image along the trajectory image that indicates the reference trajectory;
   a determination step of determining whether the position obtained at the designated position obtaining step is located within an area based on a position of the moving image during a period when the moving image is moving along the trajectory image that indicates the reference trajectory; and
   a game processing step of carrying out a game process based on a result of determination made at the determination step.

8. A computer readable information storage medium storing a program for causing a computer to function as a game device, the program causing the computer to function as:
   a display unit for displaying a game screen including a game character having a part that moves a moving image moving within the game screen and a trajectory image that indicates a reference trajectory representing movement of the part of the game character;
   a designated position obtaining unit for obtaining a position within the game screen, the position being designated by a player;
   a first moving image control unit for moving the moving image from a given initial position toward a start point of the trajectory image indicative of the reference trajectory;
   a second moving image control unit, when the moving image reaches the start point of the reference trajectory as represented by the trajectory image, for moving the moving image along the trajectory image that indicates the reference trajectory;
   a determination unit for determining whether the position obtained by the designated position obtaining unit is located within an area based on a position of the moving image during a period when the moving image is moving along the trajectory image that indicates the reference trajectory; and
   a game processing unit for carrying out a game process based on a result of determination made by the determination unit.

\* \* \* \* \*